United States Patent
Adams, Sr.

(10) Patent No.: US 7,157,394 B2
(45) Date of Patent: Jan. 2, 2007

(54) STOICHIOMETRICALLY BALANCED SILICON NITRIDE CERAMIC FOR HIGH PERFORMANCE CUTTING TOOLS

(76) Inventor: James Hugo Adams, Sr., 1286 Hathaway Rising, Rochester Hills, MI (US) 48306

(*) Notice: Subject to any disclaimer, the term of this patent is extended or adjusted under 35 U.S.C. 154(b) by 0 days.

(21) Appl. No.: 10/893,479

(22) Filed: Jul. 17, 2004

(65) Prior Publication Data

US 2006/0014625 A1 Jan. 19, 2006

(51) Int. Cl.
*C04B 35/587* (2006.01)
(52) U.S. Cl. .................... 501/97.3; 501/97.2
(58) Field of Classification Search ....... 501/97.2–97.4
See application file for complete search history.

(56) References Cited

U.S. PATENT DOCUMENTS

| | | | | | |
|---|---|---|---|---|---|
| 5,021,372 | A | * | 6/1991 | Pyzik et al. | 501/95.3 |
| 5,120,328 | A | * | 6/1992 | Pyzik | 51/309 |
| 5,160,508 | A | * | 11/1992 | Pyzik et al. | 51/307 |
| 5,312,785 | A | * | 5/1994 | Pyzik et al. | 501/95.3 |
| 5,585,314 | A | * | 12/1996 | Ezis et al. | 501/92 |
| 5,723,392 | A | * | 3/1998 | Ezis et al. | 501/92 |

* cited by examiner

*Primary Examiner*—Karl Group

(57) ABSTRACT

A silicon nitride based ceramic, that is highly effective for use as a cutting tool for the high speed machining of cast irons, that is essentially a homogeneous mixture consisting of both crystalline and whisker forms of beta silicon nitride that are interstitially bonded by a stoichiometrically balanced glass mixture of magnesia, silica, yttria and zirconia, where the ratios of each have been controlled to increase the eutectic point and refractoriness of the mixed glass.

8 Claims, No Drawings

STOICHIOMETRICALLY BALANCED SILICON NITRIDE CERAMIC FOR HIGH PERFORMANCE CUTTING TOOLS

BACKGROUND OF THE INVENTION

Since the early 1980's, silicon nitride based cutting tools have achieved an ever increasing role in the rough and finish machining of high volume cast iron parts. The growth of these cutting tools can be attributed to two factors. These factors being:

1. Silicon nitride cutting tool insert quality and performance improvements that provided improved reliability and operating parameter thresholds.
2. Machining company's acquisition of new high speed equipment, or rebuilt existing equipment that can utilize the high speed capability that silicon nitride cutting tools can provide.

Prior to the introduction of 1980's silicon nitride cutting tool inserts, oxide based cutting tools were the ceramic cutting tool insert of choice within the cast iron machining industry. Oxide cutting tools of the pre-1980 era, however, were limited to the speed at which they could machine parts due to a propensity for thermal shock and the amount of impact they could endure due to their limited fracture toughness. Consequently, the overall acceptance of these oxide based tools was limited. The early 1980 era silicon nitride cutting tools provided the cast iron machining industry a more reliable ceramic cutting tool alternative. This was the start of the legitimization of ceramic inserts for the high volume machining, including milling operations, of cast iron products.

The first generation of commercial silicon nitride cutting tool inserts was manufactured under U.S. Pat. No. 4,264,548 to Ezis, issued April 1981, and provided a process to manufacture a silicon nitride insert product that utilized yttria ($Y_2O_3$) and alumina ($Al_2O_3$) as sintering aids. The commercial cutting tools produced utilizing this art gave improved reliability and performance over the prior oxide based cutting tool insert products when used for production machining of cast iron products. U.S. Pat. No. 4,264,548 to Ezis, discusses using 4–12 w/o $Y_2O_3$ powder, and 0.50–2.5 w/o $Al_2O_3$ as sintering aids.

The second generation of commercial silicon nitride cutting tool inserts was manufactured under U.S. Pat. No. 4,652,276 to Burden, issued March 1987. This art teaches that using a combination of magnesia (MgO) and yttria ($Y_2O_3$), as sintering aids, further improves silicon nitride cutting tool insert impact resistance and insert reliability when machining cast iron products. U.S. Pat. No. 4,652,276 to Burden, discusses using 0.5 to 10.0 w/o MgO, and from 2.5 to 10 w/o $Y_2O_3$ as sintering aids.

The third generation of commercial silicon nitride cutting tool inserts is manufactured under U.S. Pat. No. 5,525,134 to Mehrotra et al., issued June 1996, which further refines the prior art of U.S. Pat. No. 4,652,276 to Burden by reducing the amount of magnesia (MgO), and yttria ($Y_2O_3$) sintering aids resulting in a further increase in cutting tool performance. Both U.S. Pat. No. 4,652,276 to Burden, and U.S. Pat. No. 5,525,134 to Mehrotra et al., teach that a ratio of or near 1 to 1, by weight, of yttria and magnesia as sintering aids in a silicon nitride ceramic can maximize cutting tool performance. Only the amounts of each of the sintering aids differ in the two inventions. U.S. Pat. No. 5,525,134 to Mehrotra et al., discusses using at least 0.2 w/o yttria and at least 0.2 w/o magnesia, wherein the sum of yttria and magnesia is less than 5 w/o as sintering aids.

There are many other commercial silicon nitride cutting tool insert compositions servicing the cast iron machining industry. Some are monolithic copies or offshoots of the arts previously mentioned. Some are sialon based products, while others are composite or whisker reinforced products. None of these commercial products, including those previously discussed, is compositionally similar or engineered as is the art disclosed within this invention.

Concurrent with the previously mentioned prior art cutting tool insert developments, other ceramic manufacturers were developing silicon nitride sintered products that include zirconia ($ZrO_2$) along with magnesia (MgO), and yttria ($Y_2O_3$) as sintering aids. U.S. Pat. No. 4,560,669 to Matsuhiro et al., issued December 1985, and U.S. Pat. No. 5,120,328 to Pyzik, issued June 1992, disclose such art. However, there is no discussion of stoichiometric balance of the sintering aids with the system's silica. U.S. Pat. No. 4,560,669 to Matsuhiro et al., discusses using 2–15 w/o yttria, 0.5–15 w/o magnesia and 0.5–13 w/o zirconia as sintering aids. While U.S. Pat. No. 5,120,328 to Pyzik, discusses using 0.5–3.0 w/o magnesia, 1.0–6.0 w/o yttria and 0.2–3.0 w/o zirconia as sintering aids.

It is generally accepted that commercially available, ultrafine, high purity alpha phase (90% plus alpha phase) silicon nitride powders, that are used for cutting tool insert manufacturing, contain small percentages of silicon dioxide (silica). This silica is thought to be in the form of a thin layer surrounding or coating the individual silicon nitride particles and is generally in the range of 2 w/o to 4 w/o of the gross silicon nitride powder's weight, depending upon the silicon nitride powder supplier and powder grade. The oxygen content of silicon nitride powder lots are analyzed for, and generally supplied, by the silicon nitride powder supplier. Since silica is 53.25 w/o oxygen, multiplying the analyzed oxygen weight percentage by 1.878, gives the weight percentage of silica in the particular silicon nitride powder lot. Knowing the exact percentage of silica in a silicon nitride powder is necessary to be able to stoichiometrically balance the sintering aids with the system's silica when forming the amorphous glass phase. This stoichiometric balance is the foundation of this invention.

SUMMARY OF THE INVENTION

It is known that a silicon nitride ceramic that is used for cutting tools must have superior properties that include toughness, heat resistance and wear resistance. Two of the factors that affect the cutting properties of silicon nitride cutting tools are the size and shape of the sintered silicon nitride crystalline and whisker particles and the cohesion, strength and refractoriness of the interstitial glass. It is discussed in the prior art, where silicon nitride cutting tools incorporate both magnesia and yttria as sintering aids, that adding magnesia to the interstitial glass phase increases the toughness but, at the same time, lowers the refractoriness of the sintered product. However, the prior art silicon nitride cutting tool materials claim broad ranges for the sintering aids that are used within their inventions. This invention shows that for maximum silicon nitride cutting tool performance, the amount of the sintering aids used in the silicon nitride ceramic body is dictated by the amount of silica in the processed powder prior to sintering. This invention also claims that cutting tool performance can be enhanced by using a combination of sintering aids that increase the refractoriness of the system's glass phase(s), and that the glass phase(s) should be stoichiometric and free of metal-oxide precipitate or solid state dispersion (i.e.: magnesia, yttria, zirconia or silica). Increasing amounts of the excess metal oxide sintering aids that are present in the sintered silicon nitride ceramic grain boundary's glass phase(s), either as precipitate or as a solid state dispersion, will have increasingly detrimental effects on the cohesiveness of the glass phase and on cutting tool performance.

The prior art discloses that silicon nitride ceramics for cutting tools are sintered at between 1650° C. and 1900° C. This invention specifies tightly banded sintering temperature ranges so that the stoichiometry of the glass(s) formed between the metal-oxide sintering aids and the system's inherent silica can be predicted and controlled. A sintering temperature of 1775° C. to 1800° C. was chosen based upon the accumulative stated data gathered from "PHASE DIAGRAMS FOR CERAMISTS". Sintering temperatures above 1800° C. could be used by re-proportioning the sintering aids to include the additional yttria-silica ($Y_2SiO_5$) glass stoichiometry.

"PHASE DIAGRAMS FOR CERAMISTS" compiled at the National Bureau of Standards and Copyright by The American Ceramic Society, teaches that mixtures of MgO, $ZrO_2$ and $Y_2O_3$, when blended together and heated to a maximum temperature of 1875° C. (this invention's maximum sintering range), will result in no reaction, or eutectic formed, with one another and each would retain its pre-heated identity within the blend. The "PHASE DIAGRAMS FOR CERAMISTS" also teaches that stoichiometric glasses of $MgSiO_3$, $Y_2Si_2O_7$ and $ZrSiO_4$ all have eutectic temperatures below 1775° C., this invention's minimum recommended sintering temperature. Therefore, at the recommended sintering temperature of between 1775° C. and 1800° C. these complex glasses are all in the liquid phase and would intermix. The "PHASE DIAGRAMS FOR CERAMISTS" also teaches that mixing $ZrSiO_4$ into $MgSiO_3$ at the recommended sintering temperature of between 1775° C. and 1800° C. will raise the temperature of the eutectic of the mixed glass, and that a eutectic temperature of over 1700° C. can be achieved in a mixture of $ZrSiO_4$ and $MgSiO_3$ glasses that contains over 30 w/o $ZrSiO_4$.

This invention shows that uniquely controlled mixtures of MgO, $SiO_2$, $Y_2O_3$ and $ZrO_2$, when heated to this invention's recommended sintering temperature of between 1775° C. and 1800° C., will form a stoichiometrically balanced mixed glass that has a eutectic temperature in excess of 1700° C. (this being over 150° C. higher than the eutectic temperature of mixtures of MgO, $SiO_2$ and $Y_2O_3$ without any $ZrO_2$) and that cutting tools made from silicon nitride ceramics that utilize this invention's principles can provide superior performance.

DETAILED DESCRIPTION OF THE INVENTION

The starting silicon nitride powder (raw material) used within the composition of the present invention, should be of a high quality and purity, and should consist of greater than 85% alpha (low temperature phase) semi-equiaxed crystalline particles and/or in the non-crystalline, amorphous form, having minimal metallic impurities, an average fineness of less than 1.2 microns (BET of greater than 4 meters squared per gram), and contain an oxygen percentage of less than 2.0% (the oxygen content being present in the form of a $SiO_2$ inherent to the silicon nitride raw material.) The silica in the interstital amorphorous phase may be less than 4.0 w/o of the silicon nitride body or in an amount greater than a 1.8 w/o but less than 3.0 w/o. After processing, because of this invention's recommended sintering time at temperature, the silicon nitride of the present invention is made up of predominantly the beta or high temperature crystalline and/or whisker form.

The purity and fineness of the magnesia, yttria and zirconia used as glass-forming sintering aids is an important consideration. The purity of magnesia, yttria and zirconia sintering aids used in the present invention are listed as being 99.9%+pure. The average particle size of yttria used, is 0.9 microns. The particle size of the magnesia used is listed to be between 1 micron and 5 microns, while the particle size of the zirconia is listed as being finer than 325 mesh (44 microns), but appeared to be much finer.

In accordance with the present invention, the silicon nitride compositions must contain zirconium oxide, yttrium oxide and magnesium oxide, or their equivalent substitutes, as sintering aids in specific ratios to each other and in amounts based upon pre-sintered composition's silica content, and where the sintering aids combine with the system's silica in a stoichiometric balance when sintered between 1775° C. and 1875° C., and form the interstitial glass phase in the sintered silicon nitride ceramic of this invention. The weight ratio of zirconia to magnesia may be 0.89 to 1.0 and 1.55 to 1.0.

The sintering aids used in this invention are magnesia, yttria, and zirconia, but it is possible to substitute other high temperature metal oxides for any or all of them without adversely affecting the high temperature properties and cutting performance of cutting tools fabricated from the silicon nitride ceramic made using them. However, weight adjustments of any substitute sintering aid used would need to be made to assure maintaining a stoichiometric balance within the glass phase. Also, any sintering substitute must not lower the eutectic temperature of the mixed glass phase below that of the glass phases outlined within this invention (some prior art inventions use one or more sintering aids that may improve the sinterability of the ceramic body, but these can have an adverse effect on the refractoriness of the resultant glass phase and the performance of cutting tools made from the sintered product). Possible substitute sintering aid candidates for MgO could include, but not be limited to, metal oxides of the 2A elements listed in the periodic table of elements; $Y_2O_3$ could include, but not be limited to, metal oxides of the 3B elements listed in the periodic table of elements; $ZrO_2$ could include, but not be limited to, metal oxides of the of 4B elements listed in the periodic table of elements.

The silicon nitride compositions of the present invention are designed to satisfy both of the following:
1. Maximize the eutectic temperature of the magnesia-silica glass ($MgSiO_3$) by combining with a specific amount of a stoichiometric zirconia-silica glass ($ZrSiO_4$).
2. Combine the system's remaining silica with yttria in a quantity to form a stoichiometric yttria-silica glass ($Y_2Si_2O_7$).

By satisfying both conditions, the present invention maximizes the hot hardness and cohesiveness of the complex amorphous glass, interstitially filling the interstices between and bonding the beta silicon nitride crystalline particles together, and minimizes any primary compounds, i.e.: magnesia, silica, yttria and zirconia, from being contained within the glass as either a precipitate or a particulate inclusion, either of which would proportionally decrease the cohesiveness and strength of the interstitial glass.

EXAMPLES

Embodiments of the present invention can be seen in the following example:

100 parts of silicon nitride powder, consisting of 90%+ alpha phase and containing 1.45 w/o oxygen (2.72 w/o silica), were ball milled together with 1.10 parts magnesia, 1.10 parts yttria and 0.30 parts zirconia in a rubber lined ball mill that was half filled (50 v/o) with zirconia grinding media (the zirconia grinding used is commercially available 3 w/o magnesia stabilized ½" diameter rounded end cylinders). The zirconia media was weighed both before and after each milling process to determine the weight of zirconia pick-up due to grinding media attrition during the milling process. Knowing the weight of zirconia milling media pick-up in the milled slurry is critical as the pick-up weight needs to be added to that of the charged zirconia powder to give total zirconia in the milled batch. Distilled water was used as the milling vehicle along with an ammonia based deflocculant. Milling time was 16 hours. The amount of zirconia milling media attrition was predetermined, via actual milling tests, to add 0.78 parts zirconia to the milled slurry after 16 hours. This makes the total amount of zirconia in the example 1 composition 1.08 parts zirconia to 100 parts silicon nitride. After milling, the milled slurry was screened to eliminate any tramp material and oven dried. After drying, the dried mixture was screened and blended. The milled powder was charged into a graphite mold coated with a boron nitride coating, to minimize any reaction between the silicon nitride powder and the graphite. The loaded die was hot pressed to 1800° C., at a pressure of 3000 psi, and held at temperature for 90 minutes. The hot pressing atmosphere was nitrogen. The density of the hot pressed blanks was measured to be 3.21 g/cc. Although hot pressing was the sintering method used to produce the test compositions within the embodiment of this invention, it is felt that alternate sintering methods that include but are not limited to, overpressure sintering, sinter HIPing, and conventional or microwave sintering with a subsequent HIPing process could yield similar results as long as the sintering temperatures, time at temperature and sintered product density remain consistent with those outlined above.

The test compositions (number 5, 6, 7 and 8) in table 1 were prepared according to this example. A.N.S.I. style TNG-336 cutting tool inserts were ground from the hot pressed blanks. The cutting tool inserts were left up-sharp (no edge conditioning).

The silicon nitride cutting tool inserts made according to this method were used to finish turn the brake surfaces of 303 mm diameter vented brake rotors, in production, at a major producer of brake systems (both brake surfaces on this rotor have ID's of 162 mm). The finish straddle turning of the brake surface operation was chosen to test the silicon nitride inserts produced using the principles embodied in this invention because the finish straddle operation is considered the most difficult and troublesome of the rotor turning operations by this rotor manufacturer. This is because of difficulties in achieving and maintaining brake surface finish and acceptable and predictable cutting tool insert tool life. The cutting tool inserts were used in a straddle turning operation (machining both brake surfaces at the same time with two inserts opposed to each other). The TNG-336 inserts are inserted into two opposed 0° lead cartridges, both having −9° radial and −5° axial rake angles. The machining conditions used to test the inserts produced using the principles inherent to this invention were the same as used for machining standard production rotors. The turning conditions for this finish straddle operation are a constant cutting speed of 1100 smpm (surface meters per minute), the depth of cut is 0.50 mm+/−0.25 mm and the feed rate is 0.16 mmpr (millimeters per revolution). The time in cut is approximately 17.5 seconds. The specifications for the rotor castings being machined is 30,000 psi cast gray iron, having a Brinell Hardness of 187–241 BHN. Currently, this rotor manufacturer considers the tool life of all previously tested commercially available finish straddle cutting tool inserts, including their current standard insert, to be unacceptably short.

The production testing of silicon nitride cutting tool inserts produced using the principles embodied within this invention, along with several commercially available silicon nitride cutting inserts from the prior arts, were sequentially run, in production, on one leg of a two leg production line. The current standard production silicon nitride insert used was simultaneously run on the other production leg. Both legs' finish straddle operation machining parameters were identical and the machining conditions were as previously stated. The inserts were indexed on each line, independently to each other, when the brake surface finish exceeded 1.10 Ra. The test inserts were run sequentially and the process was repeated a minimum of 6 times for each of the silicon nitride inserts being tested. The test insert leg and the standard insert leg were alternated at the start of every test series sequencing. The performance of both the test inserts and the standard inserts was monitored and recorded, and any abnormalities were noted. The testing was designed to take 10 weeks so that numerous different casting lots, with varying machining characteristics, would be machined by all of the inserts being tested.

In Table 1, the chemical composition (starting ingredients) of various silicon nitride cutting tool inserts tested are listed with compositions 1–3 being commercially available prior art examples, composition 4 being the current standard production insert, composition 5 is an example where the weight ratios of yttria to magnesia lie outside the recommended range of this invention, while compositions 6–8 encompass the principles of this invention.

Table 2 lists the percentage of stoichiometric balance of the various silicon nitride inserts tested.

Table 3 lists the actual cutting performance of each silicon nitride insert tested and the performance rating of each (the production standard insert's performance was the base line performance and was arbitrarily given a rating of 100%). Note: the normal preset tool life on the standard silicon nitride cutting tool inserts being used for the production finish straddle operation on this brake rotor is 80 to 100 pieces machined per insert index depending upon the casting's machinability at the time. The preset tool life includes a safety factor for automatic process reliability. During the testing period, the standard production finish straddle inserts were physically monitored to the same criteria as the test inserts.

TABLE 1

Silicon Nitride Cutting Tool Insert Starting Compositional Make-up

| Composition No. | Parts $Si_3N_4$ | Parts MgO | Parts $Y_2O_3$ | Parts $ZrO_2$ or (AlN) | Wt. ratio $Y_2O_3$ to MgO | w/o $ZrO_2$ to w/o $SiO_2$ |
|---|---|---|---|---|---|---|
| 1 | 100 | | 8.00 | | N.A. | No $ZrO_2$ |
| 2 | 93 | 3.50 | 3.50 | | 1:1 | No $ZrO_2$ |
| 3 | 98 | 1.00 | 1.00 | | 1:1 | No $ZrO_2$ |
| 4 std. | 90 | | 5.00 | 5.0 (AlN) | N.A. | No $ZrO_2$ |
| 5 test | 100 | 0.70 | 2.80 | 1.09 | 4:1 | 40.0% |
| 6 test | 100 | 0.90 | 1.5 | 1.11 | 1.67:1 | 40.8% |
| 7 test | 100 | 1.20 | 0.75 | 1.07 | 1:1.6 | 39.3% |
| 8 test | 100 | 1.10 | 1.10 | 1.08 | 1:1 | 39.7% |

TABLE 2

Silicon Nitride Cutting Tool Insert Calculated Stoichiometric Balance

| Comp. No. | w/o $O_2$ (w/o $SiO_2$) in $Si_3N_4$ | Theoretical w/o $SiO_2$ in $MgSiO_3$ | Theoretical w/o $SiO_2$ in $Y_2Si_2O_7$ | Theoretical w/o $SiO_2$ in $ZrSiO_4$ | Theoretical Total w/o $SiO_2$ Required for Stoichiometry | Theoretical Stoichiometric Balance |
|---|---|---|---|---|---|---|
| 1 | Unknown | | | | | N.A. |
| 2 | 1.47(2.76) | 5.22 w/o | 1.86 w/o | | 7.08 w/o | 39% |
| 3 | Typ. E-10 1.30(2.44) | 1.49 w/o | 0.53 w/o | | 2.02 w/o | 79% |
| 4 std. | Unknown | | | | | N.A. |
| 5 test | 1.45(2.72) | 1.04 w/o | 1.49 w/o | 0.53 w/o | 3.06 w/o | 88% |
| 6 test | 1.45(2.72) | 1.34 w/o | 0.80 w/o | 0.54 w/o | 2.68 w/o | 99% |
| 7 test | 1.45(2.72) | 1.79 w/o | 0.40 w/o | 0.52 w/o | 2.71 w/o | 100% |
| 8 test | 1.45(2.72) | 1.64 w/o | 0.59 w/o | 0.53 w/o | 2.76 w/o | 99% |

TABLE 3

Testing Results-Finish Straddle Machining of Brake Surfaces

| Composition No. | Average No. Rotors Produced | Comments on Cutting Tool Insert Performance | Performance Rating |
|---|---|---|---|
| 1 | 31 pcs. | Premature flank wear and a frequency of edge chipping | 25% |
| 2 | 49 pcs. | Premature flank wear | 40% |
| 3 | 71 pcs. | Premature flank wear | 58% |
| 4 std. | 123 pcs. | Performance ranged between 85 pcs. & 150 pcs. | 100% |
| 5 test | 118 pcs. | Performance ranged between 81 pcs. & 150 pcs. | 96% |
| 6 test | 231 pcs. | Performance ranged between 170 pcs. & 300 pcs. | 188% |
| 7 test | 212 pcs. | Performance ranged between 155 pcs. & 255 pcs. | 172% |
| 8 test | 306 pcs. | Performance ranged between 240 pcs. & 332 pcs. | 249% |

What is claimed is:

1. A silicon nitride cutting tool material consisting essentially of a dense crystalline and whisker beta silicon nitride matrix with an interstitial amorphous glass phase that consists of a mixture of silica ($SiO_2$), yttria ($Y_2O_3$), magnesia (MgO) and zirconia ($ZrO_2$) that exhibits enhanced machining performance when turning gray cast iron parts, wherein
   (a) the total silica ($SiO_2$) in the material is in an amount greater than 1.8 w/o (weight percent) but less than 3.0 w/o (weight percent);
   (b) the weight ratio of yttria ($Y_2O_3$) to magnesia (MgO) in the material is between 2.0 to 1.0 and 1.0 to 2.0;
   (c) the weight ratio of zirconia ($ZrO_2$) to magnesia (MgO) in the material is between 0.89 to 1.0 and 1.55 to 1.0;
   (d) having a manufacturing sintering temperature, or post sintering thermal treatment temperature of between 1775° C. and 1800° C.;
   (e) the amounts of yttria ($Y_2O_3$), magnesia (MgO) and zirconia ($ZrO_2$) in the material are finitely controlled so that a mixed glass made up of stoichiometric $Y_2Si_2O_7$, $MgSiO_3$ and $ZrSiO_4$ glasses is achieved.

2. A silicon nitride cutting tool material, according to claim 1, where the total silica is an inherent component in a starting silicon nitride powder.

3. A silicon nitride cutting tool material, according to claim 1, where the total silica is augmented with silica additions and/or partial oxidation of a starting silicon nitride powder during processing.

4. A silicon nitride cutting tool material, according to claim 1, where the yttria is present in an amount between 0.75 w/o to 2.80 w/o.

5. A silicon nitride cutting tool material, according to claim 1, where the magnesia is present in an amount between 0.70 w/o to 1.20 w/o.

6. A silicon nitride cutting tool material, according to claim 1, where the zirconia is present in an amount between 1.07 w/o to 1.11 w/o.

7. A silicon nitride cutting tool according to claim 1, where the zirconia is partially or fully obtained as a result of grinding media wear during powder processing.

8. A silicon nitride cutting tool material according to claim 1, where the sintering is selected from hot pressing, overpressure sintering, sinter HIPing and conventional or microwave sintering with a subsequent HIPing, utilizing a nitrogen or other suitable atmosphere to minimize oxidation, or reduction, of the silicon nitride or sintering aids.

* * * * *